United States Patent [19]

Trethewy

[11] 4,208,153
[45] Jun. 17, 1980

[54] APPARATUS FOR DISPENSING RIVETS AND SIMILAR ARTICLES

[75] Inventor: Brian R. Trethewy, Snohomish, Wash.

[73] Assignee: The Boeing Company, Seattle, Wash.

[21] Appl. No.: 864,059

[22] Filed: Dec. 23, 1977

[51] Int. Cl.² ............................ B65G 47/10; B65G 51/00
[52] U.S. Cl. ............................ 406/72; 221/124; 221/264; 221/278; 406/117
[58] Field of Search ............... 221/124, 129, 176, 264, 221/272; 222/194; 227/5; 406/72, 117

[56] References Cited

U.S. PATENT DOCUMENTS

| | | | |
|---|---|---|---|
| 2,544,165 | 3/1951 | Krasnow | 302/2 R X |
| 2,620,876 | 12/1952 | Harness et al. | 72/23 |
| 3,030,832 | 4/1962 | Filangeri et al. | 227/5 |
| 3,339,799 | 9/1967 | Spisak | 221/176 |
| 3,448,236 | 6/1969 | Spisak | 221/278 |
| 3,554,403 | 1/1971 | Ginther | 221/264 X |
| 3,883,040 | 5/1975 | Bell | 221/224 |

Primary Examiner—F. J. Bartuska
Attorney, Agent, or Firm—Lynn H. Hess; B. A. Donahue

[57] ABSTRACT

An apparatus for dispensing articles, such as rivets from a supply to a riveting machine. A frame defines a passageway including an outlet opening, and a plurality of gates are mounted on the frame for movement with respect to the frame. The gates move independently of one another and are individually operated between normal and actuated positions in a selective manner. Each gate defines a first passageway aligned with the passageway of the frame when the gate is in its normal position, and a second passageway aligned with the passageway of the frame when the gate is in the actuated position. The second passageway of each gate is positioned, when the gate is in its normal position, to receive an individual article from a supply. When a gate is operated from its normal to its actuated position the article in its second passageway is introduced to and dispensed through the passageway defined by the frame and the other gates to the outlet opening for delivery to the riveting machine.

27 Claims, 9 Drawing Figures

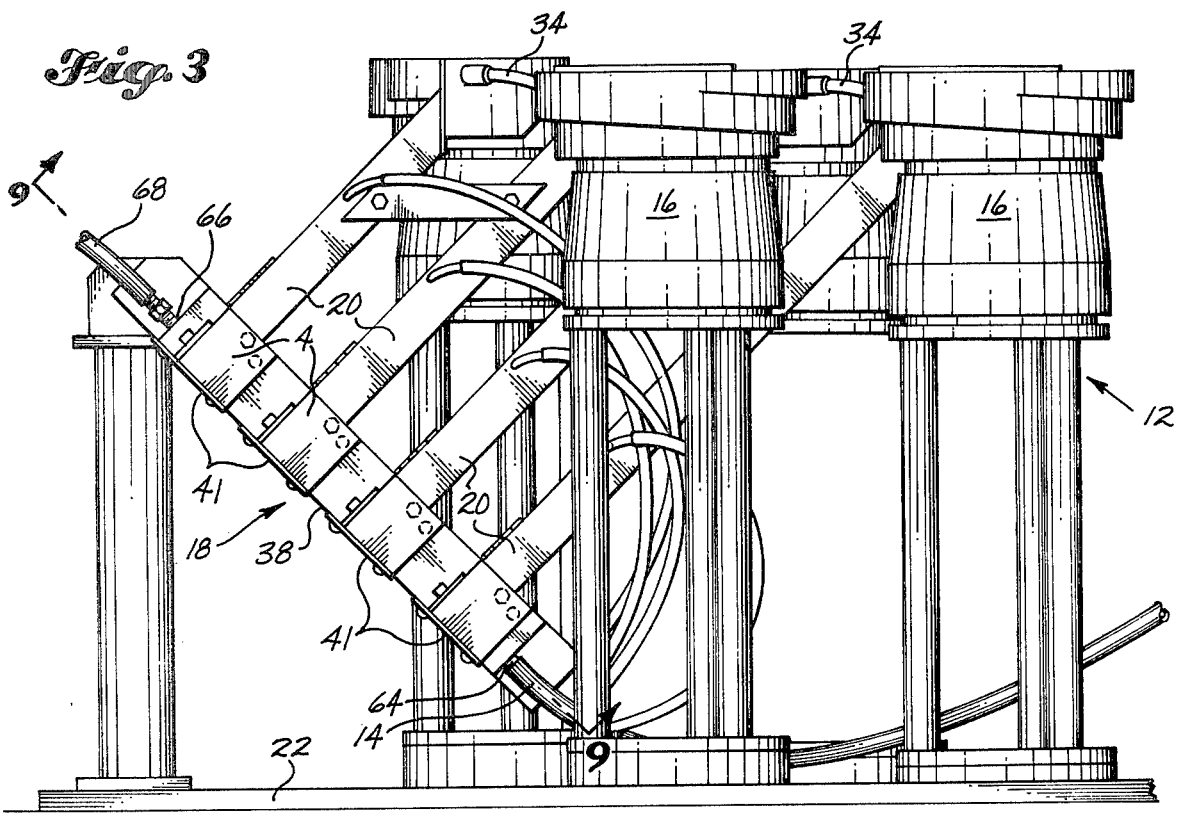
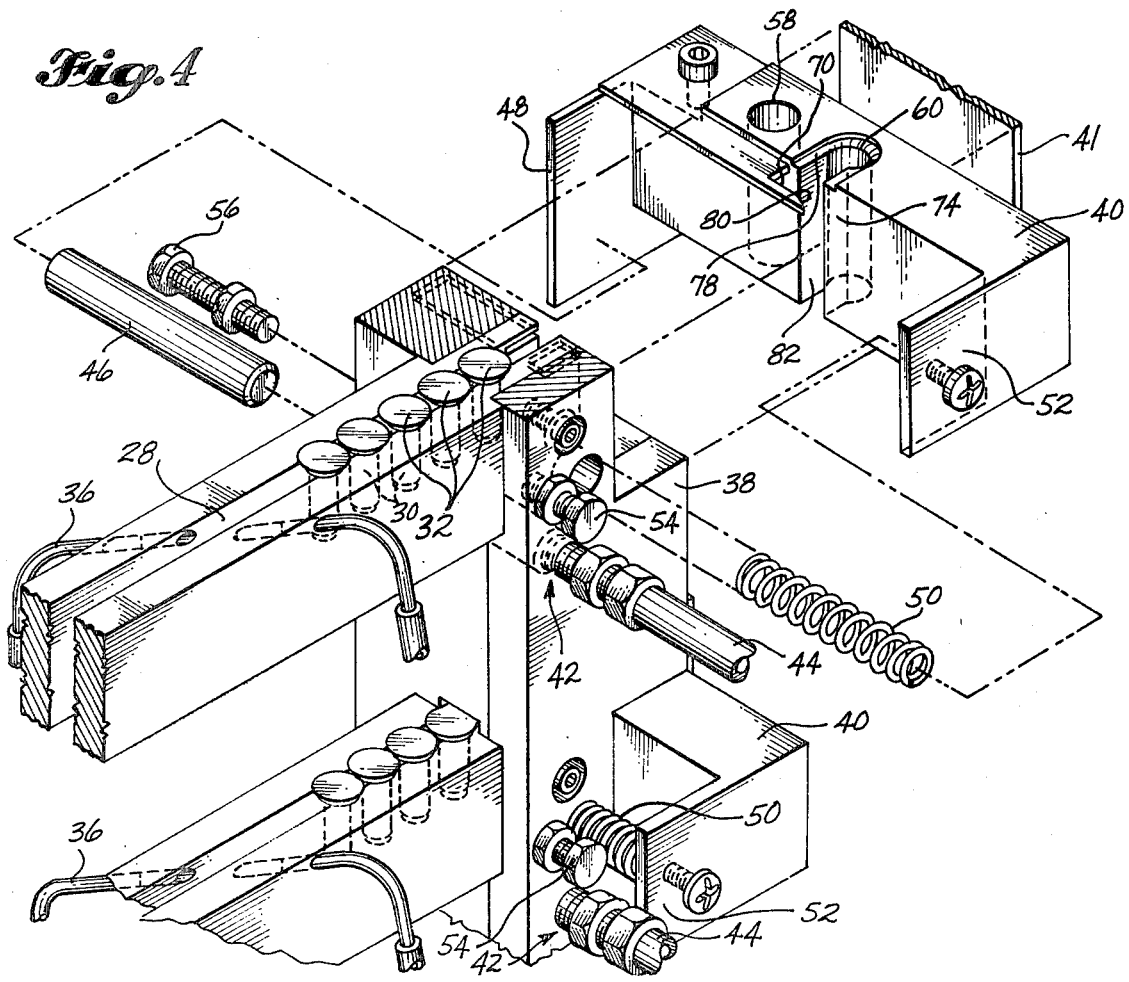

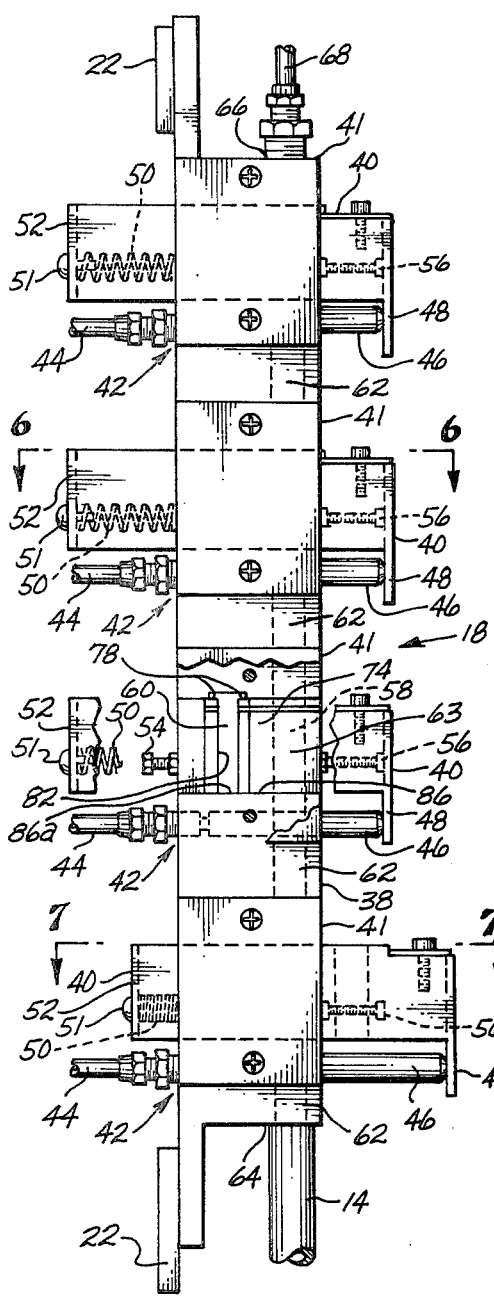
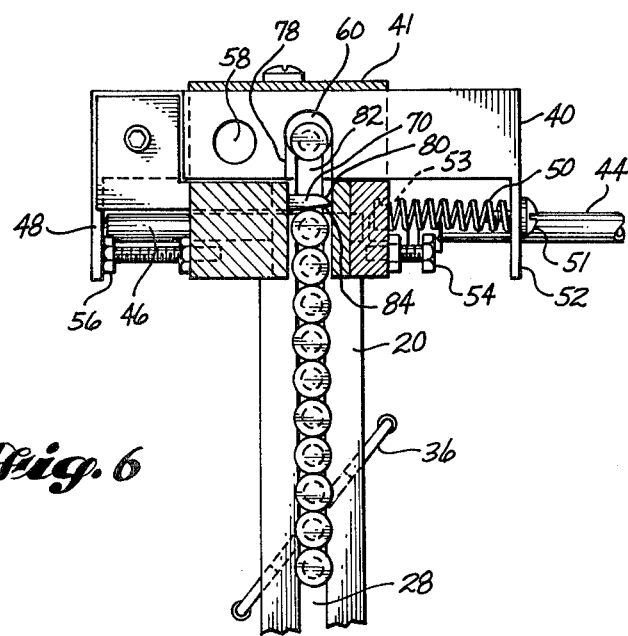
Fig. 6
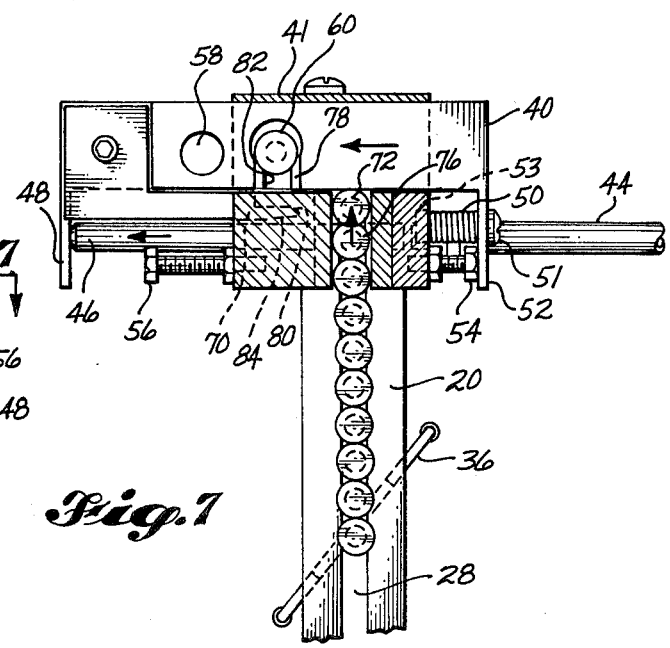
Fig. 7
Fig. 5
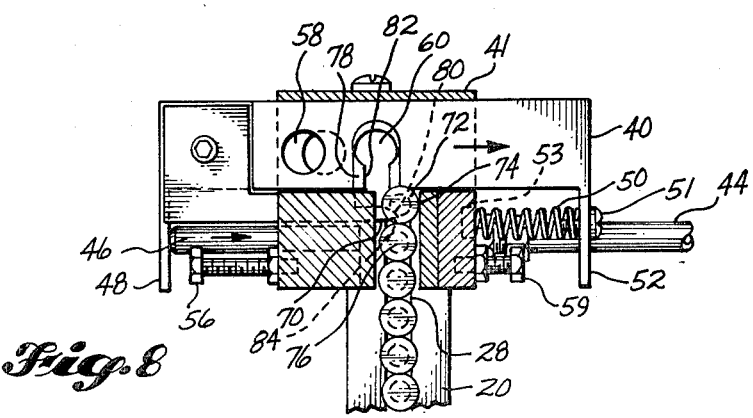
Fig. 8

APPARATUS FOR DISPENSING RIVETS AND SIMILAR ARTICLES

BACKGROUND OF THE INVENTION

This invention relates to a dispensing apparatus having a plurality of gates for selectively dispensing individual articles.

The prior art contains many different apparatus for selectively dispensing articles such as rivets. Although these devices may be satisfactory for their intended function, none provides the degree of speed, reliability, and versatility desired for compatibility with modern high-speed riveting machinery.

The U.S. Pat. No. 3,030,832 of A. E. Filangeri, et al, discloses a riveting machine including a system which automatically senses the aggregate thickness of materials to be joined together and selects and transports a rivet of proper length from a supply to a workpiece. Rivet release gates are operated by associated rotary solenoids for providing rivets from channels on an individual basis to a chute or track in response to signals from sensing means which control the individual rotary solenoids.

The U.S. Pat. No. 3,339,799 to S. Spisak discloses apparatus for feeding studs or fasteners one at a time to the chuck of a tool. This feeding apparatus includes an escapement mechanism having a slidably-movable carrier operated by a pneumatic ram.

SUMMARY OF THE INVENTION

According to the invention an improved dispensing apparatus suitable for dispensing articles such as rivets is provided. The dispensing apparatus includes a body portion and a plurality of gate members independently movable with respect to the body portion between normal and actuated positions. In their normal positions the gate members cooperate to define a passageway through the dispensing apparatus, and each gate member includes a chamber for receiving an article from a supply when the gate member is in its normal position and discharging the article into the passageway when the gate member is moved to its actuated position.

The dispensing apparatus according to the invention may also include an indexing means for insuring a proper feeding of individual articles to be dispensed, and propelling means for moving articles through the passageway may be utilized.

The dispensing apparatus according to the invention provides a compact, reliable, efficient, and uncomplicated means for dispensing articles, and can be utilized to dispense articles such as rivets in an orientated manner in rapid sequence. The dispensing apparatus according to the invention is highly versatile, and may be advantageously used for selectively dispensing articles of different sizes from one or several sources of supply to a destination remote from the supply.

DESCRIPTION OF THE DRAWINGS

FIG. 3 is a side view of the supply module and dispensing apparatus shown in FIG. 2;

FIG. 4 is an exploded perspective view of a portion of the dispensing apparatus from FIG. 3;

FIG. 5 is a view, with parts broken away, along the bottom of the dispensing apparatus of FIG. 3;

FIG. 6 is a sectional view taken along line 6—6 in FIG. 5;

FIG. 7 is a sectional view taken along line 7—7 in FIG. 5;

FIG. 8 is a sectional view similar to FIGS. 6 and 7 but showing a gate member of the dispensing apparatus between the positions shown in those figures.

DESCRIPTION OF THE PREFERRED EMBODIMENT

Figure 1:
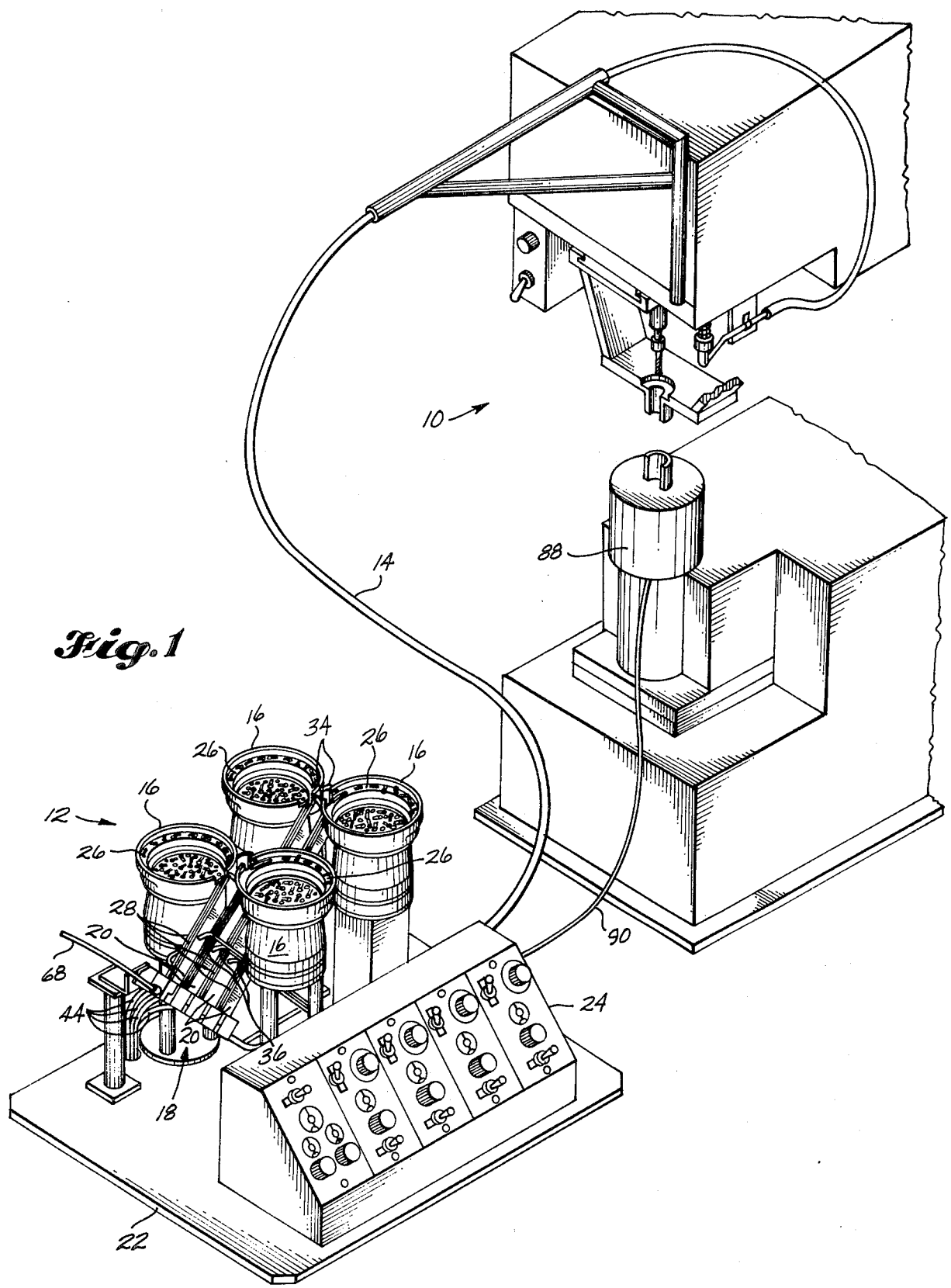
FIG. 1 is a pictorial view of a riveting machine connected to a rivet supply module employing a dispensing apparatus according to the invention.

As shown in FIG. 1, a riveting machine 10 is connected to a supply module 12 by a rivet feeding conduit 14. The details of the riveting machine and the manner of handling rivets received by the machine from conduit 14 are not important to the present invention and will therefore not be discussed. It is sufficient merely to point out that rivets delivered from conduit 14 should be properly orientated for receipt by the riveting machine.

The supply module 12 as shown in FIG. 1 includes four containers 16 which, for example, may each contain rivets of a different size. A dispensing mechanism 18 is connected to the conduit 14, and each container 16 is connected to the dispensing mechanism 18 by an associated track 20. A frame 22 of the supply module 12 supports both the containers 16 and the dispensing mechanism 18, and also supports a control console 24. The control console includes controls which may be manipulated by an operator to turn the module on and off and to affect the feed rate of the containers 16.

Figure 2:
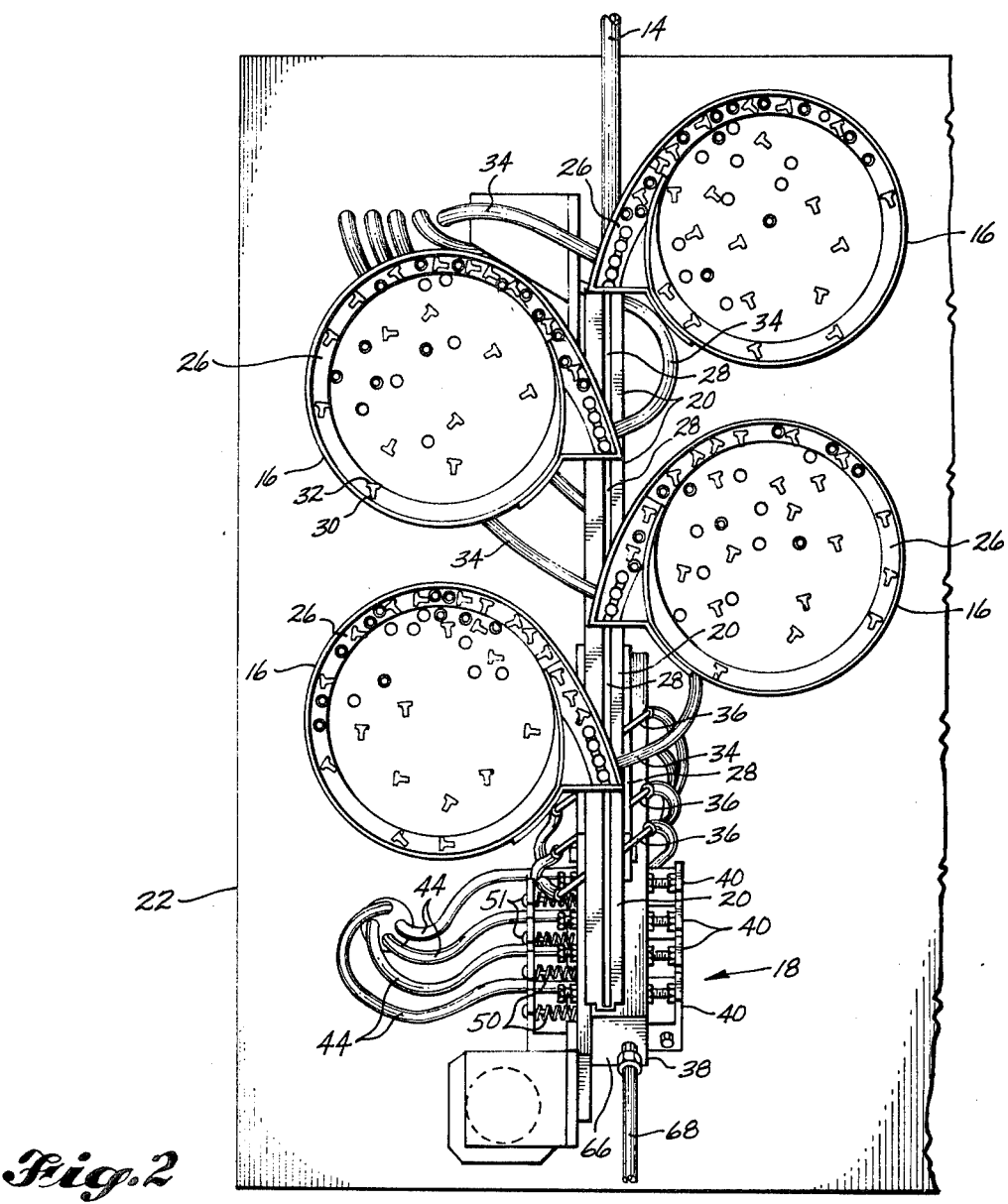
FIG. 2 is a plan view of a supply module employing a dispensing apparatus according to the invention.
Figure 9:
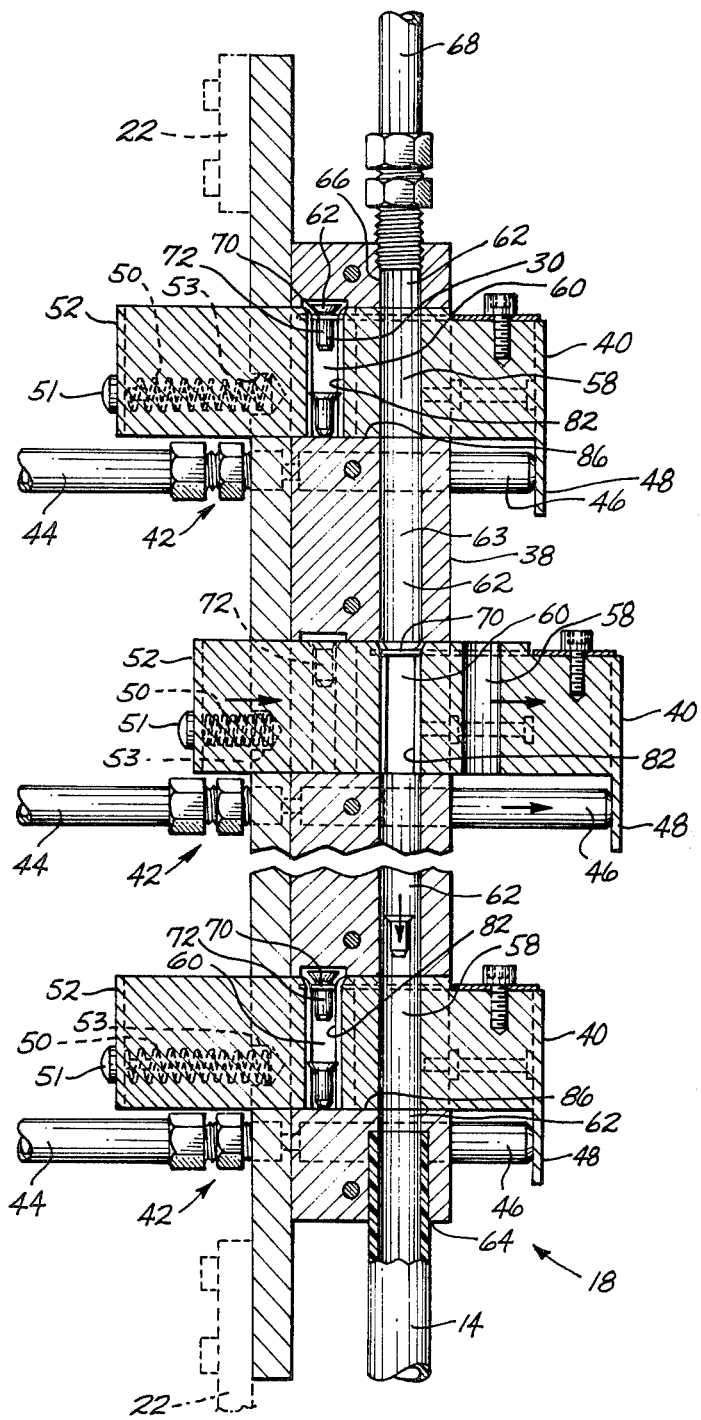
FIG. 9 is a sectional view taken along lines 9—9 in FIG. 3.

Referring now to FIG. 2, each container 16 has a ramp 26 defined along its sidewall, and means (not shown) are provided for vibrating the containers in such a manner that rivets are fed along the ramps 26 from the containers to the associated tracks 20 as is well known in the art. The tracks 20 each include a slot 28 for receiving a shank portion 30 of each rivet which then slides along a lower surface of a head portion 32. Air under pressure may be provided through tubes 34 from a source of compressed air (not shown) to blow back into the bowls any rivets which are not properly orientated with their shank portions in the slots 28. As a result, only properly orientated rivets slide downwardly along the tracks 20. A cover (not shown) may be placed over each of the tracks 20 to prevent rivets from becoming disorientated once their shank portions are within the slots 28. A pneumatic sensing arrangement may also be employed to interrupt vibration of the containers 16 whenever rivets are backed up along the tracks beyond a certain point. For example, in FIG. 2 the air tubes 36 provide streams of air across tracks 20 as shown, and if a rivet is present to interfere with a stream of air the interference may be sensed and vibration of certain or all of the containers interrupted. Such pneumatic sensing is well known.

As can be seen in FIG. 5, the dispensing mechanism 18 according to the invention comprises a frame or body portion 38 and a plurality of identical gate members or parts 40. Each gate member 40 is mounted for transverse sliding movement with respect to the dispensing mechanism between a normal and an actuated position. A gate member is shown in its normal position in FIG. 6 and in its actuated position in FIG. 7. As can be readily seen by reference to FIGS. 4 and 5, the movement of each gate is limited to sliding linear movement by an enclosure defined on three sides by the frame and on the fourth side by a plate 41, so that the frame and plate provide bearing surfaces against which the gate slides. The gate members each move independently of one another, and each has its own associated air cylinder 42 for initiating such movement. In response to a triggering signal from an operating means which may be located in the control console, compressed air is provided through a line 44 of one of the air cylinders 42 from a source (not shown) causing a plunger 46 to move against a shoulder portion 48 of the gate member to move the gate member momentarily to the actuated position. A spring 50 acting between the frame 38 and a second shoulder portion 52 of the gate member returns the gate member to its normal position as soon as the force of the air pressure from line 44 is removed. The spring may be held in position as shown in FIG. 4 by a machine screw 51 at its end adjacent shoulder portion 52 and by a circular opening 53 in the frame 38 which receives the other end of the spring. An adjustable stop in the form of a machine screw 54 may be provided to precisely limit the travel of gate member 40 in response to activation of the air cylinder 42, and an adjustable stop in the form of a machine screw 56 may be provided to precisely limit the travel of the gate member in response to the force of spring 50. Thus, the two adjustable stops 54 and 56 precisely define the actuated and normal positions of the gate member.

Although the dispensing apparatus 18 includes a plurality of gate members the gate members themselves are identical to one another and therefore only one gate member will be described in detail. As best seen in FIG. 4, each gate member 40 defines a passageway 58 through the gate member and a chamber which may also be a passageway through the gate member. In FIG. 4 the chamber is shown as a passageway 60. The gate members 40 are arranges on frame 38 so that when they are in their normal position the passageways 58 are aligned with passageway segments 62 in the frame and with each other to provide a longitudinal passageway 63 through the dispensing mechanism which is substantially continuous and enclosed. It is advantageous that the passageway 63 be substantially continuous and enclosed so that rivets passing therethrough will not become disorientated or jam, but the passageway need not be air tight. The longitudinal passageway 63 may have a generally circular cross section as shown to correspond to the shape of rivets being dispensed or may have some other shape which is compatible with the particular articles to be dispensed.

The longitudinal passageway 63 includes a lower discharge end 64 connected to the feeding conduit 14 and an upper end 66 which may be connected to a compressed air line 68 which supplies compressed air from the source (not shown). Compressed air from line 68 may be applied continuously through passageway 63; or it may be automatically controlled so as to be applied intermittently, for example each time a gate is actuated.

When a gate member 40 is in its normal position its passageway 60 is aligned in a rivet-receiving relationship with its associated feed portion or track from the supply module, and when the gate member is in its actuated position the passageway 60 is aligned with the longitudinal passageway 63 through the dispensing mechanism. Each gate member, therefore, will receive a single rivet into its passageway 60 upon moving to its normal position and deposit this rivet into longitudinal passageway 63 when the gate member is operated momentarily to its actuated position.

Indexing means in the form of a projection or finger portion 70 of gate member 40 may be provided as best seen in FIGS. 4 and 6-8. Thus, as the gate member is returned by spring 50 from its actuated to its normal position (see FIG. 8) a first rivet 72 will slide along a surface 74 defined along a side portion of the gate member until the gate member reaches the normal position (see FIG. 6). As the gate member moves, the finger 70 moves between the first rivet 72 and a second rivet 76 in the line of rivets orientated along the track 20. When the gate member 40 reaches its normal position the head of rivet 72 will slide along a track 78 defined along the top of the gate member adjacent the upper end of passageway 60, and rivet 72 will drop into passageway 60. Rivet 76, however, will be held by finger 70, as shown in FIG. 7, and will not be allowed to move into passageway 60 until rivet 74 has first been dispensed through the longitudinal passageway 63. The finger 70 may include a cam surface 80 as shown which acts against the shank portion of rivet 72 to urge rivet 72 through the opening 82 in the sidewall of the gate member and along track 78 to passageway 60. A second cam surface 84 may also be provided along the backside of finger 70 to aid in separating rivets 72 and 76 as the gate member moves back into its normal position.

The chamber in each gate member which moves a rivet from the supply track 20 to the longitudinal passageway 63 may be a passageway through the gate member 40 as shown, or it could merely be a chamber opening through a side portion of the gate member for receiving a rivet and through a bottom portion of the gate member for dispensing a rivet to the longitudinal passageway of the dispensing apparatus. However, one important advantage in having the chamber take the form of a passageway through the gate member is that the longitudinal passageway will then be continuous from the discharge end to the upper end of the dispensing mechanism even when the gate member is in its actuated position. This allows a single source of compressed air such as may be provided through line 68 to serve as a propelling means for moving a rivet out of passageway 63 and through the longitudinal passageway and the feeding conduit 14. It would also be possible to combine the passageways 58 and 60 into a single passageway of greater extent, but gate members having separate passageways as disclosed are much more effective in maintaining the rivets in an orientated position during the dispensing operation, especially where compressed air is used to propel rivets through the longitudinal passageway of the dispensing apparatus.

Another potential modification of the dispensing apparatus as disclosed would eliminate the segments of longitudinal passageway provided by the frame 38 and mount the gate members closely adjacent one another so that passageways 58 would themselves form a substantially continuous longitudinal passageway through the dispensing mechanism. While this would make the dispensing mechanism more compact it would also make precise mounting of the gate members more difficult, and the gate members' precision of movement could be impaired. Furthermore, if the dispensing apparatus were to be modified in this way it would then be necessary, when a gate member moved from its normal to its actuated position, for the rivet being dispensed to slide along an upper surface of the gate member immediately below it; and it would therefore not be possible to employ the preferred passageways 60. In the preferred embodiment, as disclosed, a rivet being dispensed slides along a surface 86 of the frame 38 as the gate member moves from its normal to its actuated position. Of course a portion 86a of this surface 86 defines a boundary of the rivet-receiving chamber against which the rivet in the chamber rests with the gate member in its normal position.

The gate members are each operated individually by their associated air cylinders as previously described, and control over these air cylinders may be either manual or automatic. The United States patent to Filangeri, et al, earlier cited herein discloses one possible form of an automatic sensing and operating means which could be used to automatically control the air cylinders 42 of the present invention, or manual control of the air cylinders could be accomplished by providing a manually operable valve in each of the lines 44 which could be manipulated by an operator. Since this invention is limited to the dispensing apparatus itself, no effort has been made to describe in detail a particular or preferred means for controlling the air cylinders. However, as shown, the riveting machine 10 includes a sensing means 88 connected by cable 90 to a selecting and operating means located in console 24, and it is the operating means which controls the pressure in air lines 44 for selectively actuating the air cylinders. The Filangeri, et al patent discloses a similar arrangement in greater detail.

In operation the supply module 12 stores rivets and supplies orientated rivets of the four different sizes from containers 16 along tracks 20 to the dispensing apparatus 18, with each feed portion or track from the rivet supply module being associated with a different one of the gate members 40 of the dispensing apparatus. Each gate member of the dispensing apparatus is biased to its normal position by its associated spring 50, and the dispensing chamber or passageway 60 of each gate member initially contains a rivet waiting to be dispensed. The sensing means on the riveting machine provides a signal to rivet selection or operating means within the console which in turn causes the appropriate air cylinder to be actuated, thereby causing the gate member associated with that particular air cylinder to move to an actuated position.

As the gate member 40 moves it maintains the orientation of the rivet and slides the rivet along surface 86 until the gate member reaches its actuated position. At this point the rivet in the passageway 60 drops into the longitudinal passageway 63 formed by the frame segments and the other gate members 40 below the actuated gate member, and compressed air from air line 68 moves the rivet quickly through the passageway 63, into the conduit 14, and through the conduit 14 to the riveting machine where the rivet is positioned for a heading operation. With the gate member 40 in its actuated position the finger 70 no longer provides an obstruction across the track 20, and the first rivet 72 in the row slides forward to contact and rest against the surface 74 of the gate member.

The affected gate member remains in its actuated position only momentarily until pressure in the air cylinder drops and the spring 50 returns the gate member to its normal position. As the gate member moves back to its normal position (see FIG. 8) the distal end of finger 70 moves between the first rivet 72 and the second rivet 76 in the row on track 20. As the gate member moves, the cam surfaces on the finger move the first and second rivets apart and the first rivet is urged through opening 82 in the side of the gate so that the head of the rivet slides along track 78 at the top of the gate until the rivet falls into passageway 60 where it is restrained by surface 86a of the frame 38 in position to be dispensed at the appropriate time.

Thus the sensing and selecting means determine which rivet size is desired and provide an input to the operating means located in the control console 24. The operating means responds by energizing the air cylinder which will actuate the appropriate gate member to dispense the size of rivet required. Each dispensing operation occurs very rapidly, and because all rivets are orientated and restrained at all times both prior to and during the dispensing operation there is virtually no opportunity for the rivets to become disorientated or jam the dispensing or feeding mechanisms.

The numer of gates utilized in a dispensing mechanism according to the invention is not limited to the four as shown for the disclosed embodiment; and, in fact, it is possible to connect several separate supply models and dispensing mechanisms as units together for selectively supplying rivets to a single source by simply connecting the rivet feeding conduit 14 from one such unit to the upper end 66 of the passageway 63 of another such unit. Thus, whether by using units having many containers and gates or by connecting together several separate and possibly remote units it is possible to provide a large selection of rivet sizes and yet dispense the rivets very rapidly, in any desired order, and with great reliability.

The foregoing description of my invention discloses a preferred embodiment thereof, and various changes and omissions in form and detail may be made within the scope of the invention which is defined and limited only by the following claims.

What is claimed is:

1. In a feeding apparatus including a supply module having a plurality of feed portions each of which provide an orientated supply of a different size of articles, conveying means for receiving an individual article and conveying it to a desired location, and selection means for determining the size of article to be conveyed and providing a signal representative thereof; an improved dispensing means responsive to said signal for receiving the proper sized article from said supply module and providing said article to said conveying means, said dispensing means comprising: a body portion defining a plurality of aligned passageway segments and including a first end connected to said conveying means; and gate means including a plurality of parts each corresponding to a different one of said feed portions and located at least partially aligned with said passageway segments in a different space between adjacent segments, said parts individually movable in response to said signals between normal and actuated positions with respect to said body portion, each said part defining passage means therethrough for cooperating with said passageway segments to provide a substantially continuous enclosed article-passageway through said dispensing means whenever said part is in said normal or said actuated position and for receiving an article from its corresponding feed portion and introducing said article into said article-passageway upon movement of said part from said normal to said actuated position.

2. In a feeding apparatus as claimed in claim 1 including indexing means associated with each said part of said gate means for providing only one article to a part from its corresponding feed portion in response to the return of said part from its actuated to its normal position.

3. In a feeding apparatus as claimed in claim 1 including means for propelling said article, upon introduction of said article into said article-passageway, through said dispensing means and said conveying means.

4. In a riveting apparatus including a supply module for providing an orientated supply of rivets of different sizes from different feed portions thereof, a riveting machine for fastening rivets to a workpiece, and a conduit connected to said riveting machine for conveying individual rivets from said supply module to said riveting machine; the improvement comprising a dispensing mechanism including: a frame defining a longitudinal passageway having a first end connected to said conduit; a plurality of gate members carried by said frame and transversely slidable with respect thereto between normal and actuated positions, each said gate member defining a first passageway aligned with said longitudinal passageway whenever said gate member is in said normal position and a chamber aligned with said longitudinal passageway whenever said gate member is in said actuated position, said chamber aligned with a corresponding one of said feed portions such that a rivet is introduced into said chamber each time said gate member returns to said normal position; and rivet selection means for causing a selected one of said gate members to move momentarily from said normal to said actuated position and thereby dispense a rivet into said conduit.

5. In a riveting apparatus as claimed in claim 4 wherein said chamber is a second passageway, and the longitudinal passageway defined by said frame, the first passageways of said gate members in said normal position, and the second passageway of any said gate member in said actuated position together define a continuous and substantially enclosed passageway through said dispensing mechanism to said conduit.

6. In a riveting apparatus as claimed in claim 5 including means for providing compressed air at a second end of said longitudinal passageway for propelling a rivet through said continuous and substantially enclosed passageway.

7. In a riveting apparatus as claimed in claim 4 including air piston means for moving individual said gate members to said actuated position when triggered by said rivet selection means, and spring means for returning said individual gate members from said actuated to said normal position.

8. In a riveting apparatus as claimed in claim 4 wherein each said gate member includes a side portion defining an opening through which said rivet is introduced into said chamber.

9. In a riveting apparatus as claimed in claim 8 wherein said chamber comprises a second passageway through said gate member and each said gate member further includes a top portion defining a track along which a head portion of said rivet slides as said rivet moves through said opening into said second passageway.

10. In a riveting apparatus as claimed in claim 8 wherein said side portion further defines a surface portion against which a first rivet in said corresponding feed portion rests whenever said gate member is not in said normal position.

11. In a riveting apparatus as claimed in claim 4 wherein said longitudinal passageway is inclined approximately 45 degrees from vertical.

12. In a riveting apparatus as claimed in claim 4 wherein said frame includes surfaces adjacent each gate member for restraining movement of a rivet in said chamber and providing a path along which said rivet slides when said gate member moves from said normal to said actuated position.

13. In a riveting apparatus including a supply module for providing an orientated supply of rivets of different sizes from different feed portions thereof, a riveting machine for fastening rivets to a workpiece, and a conduit connected to said riveting machine for conveying individual rivets from said supply module to said riveting machine; the improvement comprising a dispensing mechanism including: a frame defining a longitudinal passageway having a first end connected to said conduit; a plurality of gate members carried by said frame and transversely slidable with respect thereto between normal and actuated positions, each said gate member defining a first passageway aligned with said longitudinal passageway whenever said gate member is in said normal position and a chamber aligned with said longitudinal passageway whenever said gate member is in said actuated position, said chamber aligned with a corresponding one of said feed portions such that a rivet is introduced into said chamber each time said gate member returns to said normal position; and rivet selection means for causing a selected one of said gate members to move momentarily from said normal to said actuated position and thereby dispense a rivet into said conduit, said gate members each including a side portion defining an opening through which said rivet is introduced into said chamber, and said side portions further defining a surface portion against which a first rivet in said corresponding feed portion rests whenever said gate member is not in said normal position, said gate members each including a finger portion spaced from and extending generally across said opening, said finger portion movable with said gate member such that when said gate member returns from said actuated to said normal position said finger moves between a second rivet in said corresponding feed portion and said first rivet and prevents said second rivet from following said first rivet into said opening.

14. In a riveting apparatus as claimed in claim 13 wherein a distal end of said finger portion defines a cam surface for urging said first rivet towards said opening as said gate member returns to said normal position.

15. Rivet dispensing apparatus for dispensing rivets from a supply, said dispensing apparatus comprising a body portion; a plurality of gate members each slidably mounted on said body portion for independent movement between normal and actuated positions, each said gate member defining a first passageway through said gate member and a chamber in said gate member, said first passageways aligned with each other with said gate members in said normal positions to define a substantially continuous enclosed passageway including a discharge end, said chamber of each said gate member positioned to receive a rivet from said supply when said gate member is in said normal position and to introduce said rivet to said substantially continuous enclosed passageway when said gate member is in said actuated position; means for selectively operating said individual gate members between said normal and said actuated positions so that a rivet in the chamber of a gate member is introduced into said substantially continuous enclosed passageway upon operation of the gate member from its normal to its actuated position; and means for moving a rivet through said substantially continuous enclosed passageway to said discharge end thereof.

16. Rivet dispensing apparatus as claimed in claim 15 wherein each said gate member includes a side portion defining an opening through which said rivet is received by said chamber.

17. Rivet dispensing apparatus as in claim 16 wherein said chamber comprises a second passageway and each said gate member further includes a top portion defining an opening communicating with said second passageway and a track along which a head portion of said rivet slides as said rivet is received by said second passageway.

18. Rivet dispensing apparatus as claimed in claim 16 wherein said side portion further defines a surface portion against which a first rivet from said supply rests whenever said gate member is not in said normal position.

19. Rivet dispensing apparatus as claimed in claim 15 wherein said body portion includes portions separating said gate members from one another and defining a plurality of passageway segments aligned with said first passageways with said gate members in said normal positions, said passageway segments and said first passageways together defining said substantially continuous enclosed passageway.

20. Rivet dispensing apparatus as claimed in claim 15 wherein said substantially continuous enclosed passageway has a generally circular cross section.

21. Rivet dispensing apparatus as claimed in claim 19 wherein said body portion includes surfaces adjacent each gate member for restraining a rivet in said chamber and providing a path along which said rivet slides when said gate member moves from said normal to said actuated position.

22. Rivet dispensing apparatus for dispensing rivets from a supply, said dispensing apparatus comprising a body portion; a plurality of gate members each slidably mounted on said body portion for independent movement between normal and actuated positions, each said gate member defining a first passageway through said gate member and a chamber in said gate member, said first passageways aligned with each other with said gate members in said normal positions to define a substantially continuous enclosed passageway including a discharge end, said chamber of each said gate member positioned to receive a rivet from said supply when said gate member is in said normal position and to introduce said rivet to said substantially continuous enclosed passageway when said gate member is in said actuated position; and means for selectively operating said individual gate members between said normal and said actuated positions so that a rivet in the chamber of a gate member is introduced into said substantially continuous enclosed passageway upon operation of the gate member from its normal to its actuated position and said rivet is delivered through said substantially continuous enclosed passageway to said discharge end thereof, said gate members each including a side portion defining an opening through which said rivet is received by said chamber and said side portion further defining a surface portion against which a first rivet from said supply rests whenever said gate member is not in said normal position, said gate members each including a projection spaced from and extending generally across said opening, said projection movable with said gate member such that when said gate member returns from said actuated to said normal position said projection moves between a second rivet from said supply and said first rivet thereby preventing said second rivet from entering said chamber.

23. Rivet dispensing apparatus as claimed in claim 22 wherein a distal end of said projection defines camming means for urging said first rivet towards said opening as said gate member returns from its actuated to its normal position.

24. A rivet-dispensing apparatus for use in a rivet-feeding system which includes a supply having a plurality of individual sources for each providing orientated rivets of a particular size different from the others, a conveying means for receiving an individual rivet and conveying it to a desired location, and a selection means for determining the size of rivet to be conveyed and providing a triggering signal representative thereof; said rivet-dispensing apparatus comprising:

a body defining a plurality of aligned passageway segments and including a first end connected to said conveying means, a plurality of gates each corresponding to a different one of said individual sources and located at least partially aligned with said passageway segments in a different space between adjacent segments, said gates individually movable in response to said signals between a normal position and an actuated position with respect to said body, said gates each defining a passage means therethrough for cooperating with said passageway segments to provide a continuous enclosed rivet passageway through said dispensing apparatus whenever said gates are in either said normal or said actuated positions and for receiving a rivet from its corresponding source and introducing said rivet into said rivet passageway upon movement of one of said gates from said normal to said actuated position in response to said triggering signal, and means for moving a rivet introduced into said rivet passageway through said rivet passageway to said conveying means.

25. A rivet-dispensing apparatus as in claim 24 including indexing means for preventing more than one rivet from being received by a gate in response to movement of that gate from said actuated to said normal position.

26. A rivet-dispensing apparatus for use in a rivet-feeding system which includes a supply having a plurality of individual sources for each providing orientated rivets of a particular size different from the others, a conveying means for receiving an individual rivet and conveying it to a desired location, and a selection means for determining the size of rivet to be conveyed and providing a triggering signal representative thereof; said rivet-dispensing apparatus comprising:

a body defining a plurality of aligned passageway segments and including a first end connected to said conveying means, a plurality of gates each corresponding to a different one of said individual sources and located in a different space between adjacent segments, said gates individually movable in response to said signals between a normal position and an actuated position with respect to said body, said gates each defining a passage means therethrough for cooperating with said passageway segments to provide a continuous enclosed rivet passageway through said dispensing apparatus and for receiving a rivet from its corresponding source and introducing said rivet into said rivet passageway upon movement of said gate from said normal to said actuated position in response to said triggering signal, and means for moving a rivet introduced into said rivet passageway through said passageway to said conveying means, said rivet-dispensing apparatus including indexing means for preventing more than one rivet from being received by a gate in response to movement of that gate from said actuated to said normal position, said indexing means comprising a plurality of indexing fingers each connected to a different one of said gates for moving between adjacent rivets of its associated source in response to movement of its gate from said actuated to said normal position.

27. A rivet-dispensing apparatus for use in a rivet-feeding system which includes a supply having a plurality of individual sources for each providing orientated rivets of a particular size different from the others, a conveying means for receiving an individual rivet and conveying it to a desired location, and a selection means for determining the size of rivet to be conveyed and providing a triggering signal representative thereof; said rivet-dispensing apparatus comprising:

a body defining a plurality of aligned passageway segments and including a first end connected to said conveying means, a plurality of gates each corresponding to a different one of said individual sources and located in a different space between adjacent segments, said gates individually movable in response to said signals between a normal position and an actuated position with respect to said body, said gates each defining a passage means therethrough for cooperating with said passageway segments to provide a continuous enclosed rivet passageway through said dispensing apparatus and for receiving a rivet from its corresponding source and introducing said rivet into said rivet passageway upon movement of said gate from said normal to said actuated position in response to said triggering signal, and means for moving a rivet introduced into said rivet passageway through said passageway to said conveying means, said rivet-dispensing apparatus including indexing means for preventing more than one rivet from being received by a gate in response to movement of that gate from said actuated to said normal position, said indexing means comprising a plurality of indexing fingers each connected to a different one of said gates for moving between adjacent rivets of its associated source in response to movement of its gate from said actuated to said normal position, each said indexing finger including a cam surface defined on a distal end thereof for urging a single rivet into said passage means in response to movement of its gate from said actuated to said normal position.

* * * * *